J. T. JONES.
Peanut-Stripper.

No. 225,613. Patented Mar. 16, 1880.

WITNESSES
Robert Everitt
Chas. G. Page

INVENTOR
John T. Jones
Gilmore, Smith & Co.
ATTORNEYS

UNITED STATES PATENT OFFICE.

JOHN T. JONES, OF SUSSEX COURT-HOUSE, VIRGINIA.

PEANUT-STRIPPER.

SPECIFICATION forming part of Letters Patent No. 225,613, dated March 16, 1880.

Application filed January 10, 1880.

*To all whom it may concern:*

Be it known that I, JOHN T. JONES, of Sussex Court-House, in the county of Sussex and State of Virginia, have invented certain new and useful Improvements in Peanut-Strippers; and I do hereby declare that the following is a full, clear, and exact description of the construction and operation of the same, reference being had to the annexed drawings, making a part of this specification, and to the letters and figures of reference marked thereon.

Figure 1:
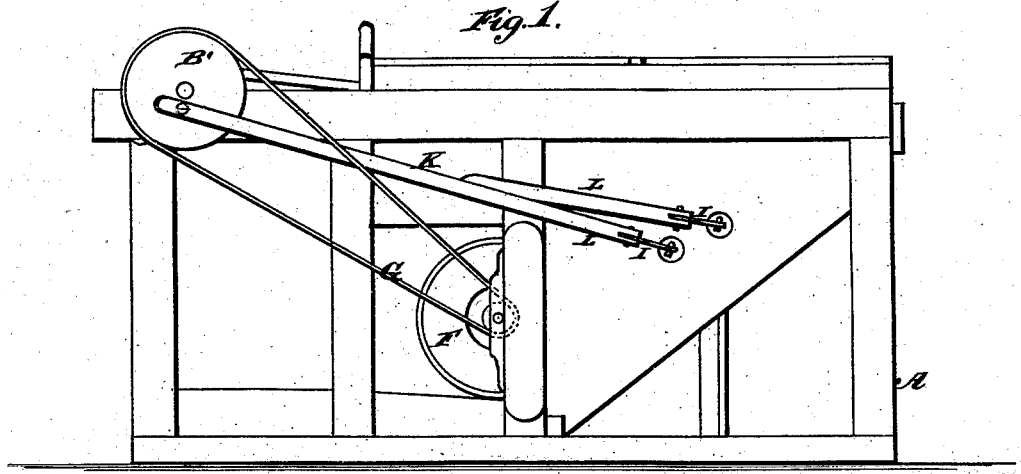
Figure 2:
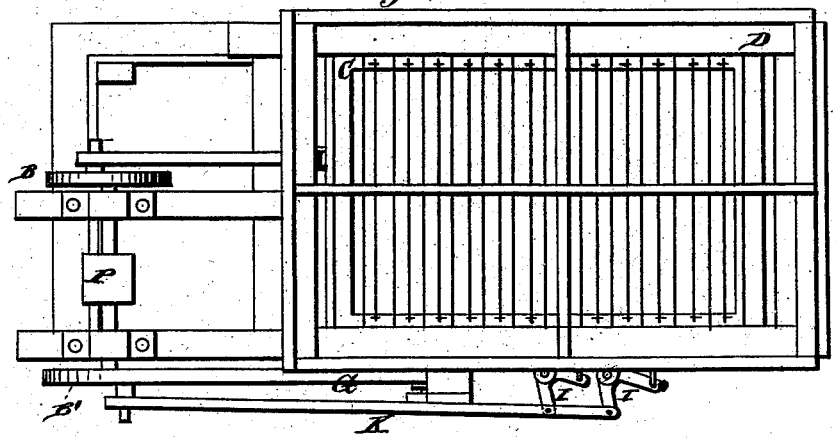
Figure 3:
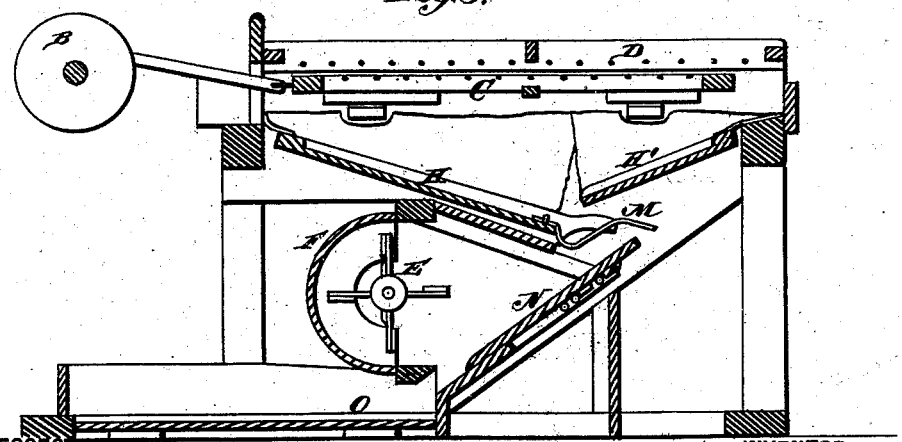

Figure 1 of the drawings is a representation of a side elevation of peanut-stripper. Fig. 2 is a plan view of the same, and Fig. 3 is a longitudinal sectional view.

My invention relates to a machine for stripping off peanuts from the vines; and it consists in the construction and arrangement of parts, as herein fully described, and particularly pointed out in the claims.

A designates the main frame, upon which is supported the axis of two crank-wheels, B B'. The crank-wheel B imparts a reciprocating movement to a sliding sieve, C, which is composed of a frame with wires stretched across it. Above this sieve is a similarly-constructed sieve, D, this latter one being, however, stationary.

The crank-wheel B' imparts a rotary movement to a fan, E, within a drum, F, by means of an endless belt, G, and this crank-wheel also reciprocates the inclined bottom boards, H H', of a hopper through the medium of bell-crank levers I and a connecting-rod, K, which branches out into the two rods L L, so as to connect with the two bell-crank levers I I.

The bottom boards of the hopper are connected with its sides by any flexible fabric, and have sufficient lateral play to cause the nuts to be shaken down through the discharge-opening. The shaking-board H is provided along its lower edge with bent teeth M, composed of stout wires, at a proper distance apart to allow the nuts to pass through and down upon a chute, N, which leads to the box or receptacle O.

In operation, the vines are not torn and carried with the nuts, the latter being stripped off by the vibrating sieve as they are passed down through the upper sieve. Falling into the hopper, the peanuts pass down onto the chute, and thence into the box or receptacle O. The teeth M arrest any portion of vines which possibly may get into the hopper, and the rotary fan blows all litter and "pops" from the descending nuts. Upon the axis of the crank-wheels is a roller, P, and by applying a belt to this the machine may be driven, suitable mechanism being, of course, employed for a horse-power apparatus.

What I claim, and desire to secure by Letters Patent, is—

1. A peanut-stripping machine provided with the sliding reciprocating sieve C, and the stationary sieve D, arranged above sieve C, both being arranged above a hopper to receive the nuts, substantially as set forth.

2. In a peanut-stripping machine, the vibrating and stationary sieves C D, the hopper with shaking boards H H', teeth M, drum F, with a rotary fan, and the chute leading to a box or receptacle, O, substantially as specified.

3. A peanut-stripper provided with a sliding and stationary sieve, the former arranged below the latter, a hopper, chute, and blast, as set forth.

In testimony that I claim the above I have hereunto subscribed my name in the presence of two witnesses.

JOHN THOMAS JONES.

Witnesses:
 J. SYDNEY BOBBITT,
 JOS. A. MASON.